United States Patent
Oh et al.

(10) Patent No.: US 10,622,121 B2
(45) Date of Patent: Apr. 14, 2020

(54) SHEATH HEATER

(71) Applicants: HYUNDAI MOTOR COMPANY, Seoul (KR); KIA MOTORS CORPORATION, Seoul (KR)

(72) Inventors: Man Ju Oh, Yongin-si (KR); Sang Shin Lee, Suwon-si (KR); So La Chung, Seoul (KR); Jae Woong Kim, Hwaseong-si (KR); So Yoon Park, Suwon-si (KR); Jae Woo Park, Ansan-si (KR); Ki Seung Bae, Asan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 232 days.

(21) Appl. No.: 15/827,918

(22) Filed: Nov. 30, 2017

(65) Prior Publication Data
US 2019/0074112 A1 Mar. 7, 2019

(30) Foreign Application Priority Data
Sep. 5, 2017 (KR) .................. 10-2017-0113072

(51) Int. Cl.
| | |
|---|---|
| *H01C 1/028* | (2006.01) |
| *B60H 1/22* | (2006.01) |
| *H02H 5/04* | (2006.01) |
| *B60H 1/00* | (2006.01) |
| *F24H 1/00* | (2006.01) |
| *F24H 1/12* | (2006.01) |
| *F24H 1/16* | (2006.01) |

(52) U.S. Cl.
CPC .......... *H01C 1/028* (2013.01); *B60H 1/2221* (2013.01); *H02H 5/047* (2013.01); *B60H 1/00978* (2013.01); *F24H 1/0018* (2013.01); *F24H 1/121* (2013.01); *F24H 1/162* (2013.01)

(58) Field of Classification Search
None
See application file for complete search history.

(56) References Cited

U.S. PATENT DOCUMENTS

| | | | | |
|---|---|---|---|---|
| 1,859,765 A | * | 5/1932 | Burleigh ................. | H01C 10/12 338/24 |
| 2,494,333 A | * | 1/1950 | Daly ........................ | H05B 3/48 338/239 |
| 2,669,636 A | * | 2/1954 | Rawles .................... | H05B 3/48 219/544 |

(Continued)

*Primary Examiner* — Thor S Campbell
(74) *Attorney, Agent, or Firm* — Morgan, Lewis & Bockius LLP

(57) ABSTRACT

A sheath heater includes: a housing having an accommodating space formed therein; a plurality of main terminals electrically connected to an outside of the sheath heater through an electric circuit, wherein the accommodating space is filled with magnesia and the plurality of main terminals are disposed in the accommodating space to penetrate through one side and another side of the housing; an overheat preventing means located in the housing, connected in series with the electric circuit, and having a PTC element controlling a flow of current of the electric circuit according to a temperature of the PTC element; and a heating element electrically connected to the electric circuit and generating heat during the flow of current.

11 Claims, 4 Drawing Sheets

(56) References Cited

U.S. PATENT DOCUMENTS

| | | | |
|---|---|---|---|
| 3,399,295 A * | 8/1968 | Chaustowich | H05B 1/0213 219/523 |
| 3,746,838 A * | 7/1973 | Drugmand | F24H 1/106 219/512 |
| 3,922,528 A * | 11/1975 | Nickmeyer | A01K 63/065 219/523 |
| 4,107,514 A * | 8/1978 | Ellson | A01K 63/065 174/51 |
| 4,152,578 A * | 5/1979 | Jacobs | H05B 3/82 219/536 |
| 4,186,369 A * | 1/1980 | Attridge | H01C 1/02 219/541 |
| 4,358,667 A * | 11/1982 | Johnson | H05B 3/82 219/508 |
| 4,697,069 A * | 9/1987 | Bleckmann | H05B 3/48 219/510 |
| 4,725,711 A * | 2/1988 | Minegishi | F23Q 7/001 123/145 A |
| 4,900,897 A * | 2/1990 | Cunningham | H05B 3/48 219/523 |
| 5,020,128 A * | 5/1991 | Bleckmann | H01H 37/48 219/512 |
| 5,044,556 A * | 9/1991 | Suzuki | A47K 10/32 222/183 |
| 5,059,768 A * | 10/1991 | Hatanaka | F23Q 7/001 123/145 A |
| 5,380,987 A * | 1/1995 | Morici | H05B 3/04 219/544 |
| 5,408,579 A * | 4/1995 | Hunt | A47J 27/21016 392/498 |
| 5,459,812 A * | 10/1995 | Taylor | H05B 3/82 392/498 |
| 5,834,736 A * | 11/1998 | Kawamura | F02P 19/02 219/270 |
| 6,820,502 B2 | 11/2004 | Jiang et al. | |
| 8,217,319 B2 * | 7/2012 | Pottie | G05D 23/022 219/482 |
| 10,283,293 B2 * | 5/2019 | Ullermann | H01H 37/04 |
| 2006/0002046 A1 * | 1/2006 | Francis | H01C 7/12 361/103 |
| 2006/0175877 A1 * | 8/2006 | Alionte | A47C 7/74 297/180.14 |
| 2007/0272525 A1 * | 11/2007 | Suzuki | H01H 81/02 200/16 R |
| 2008/0107964 A1 * | 5/2008 | Choi | H01M 2/0404 429/174 |
| 2008/0175572 A1 * | 7/2008 | Barnes | H05B 3/48 392/497 |
| 2015/0022311 A1 * | 1/2015 | Oohira | H02H 5/042 337/299 |

\* cited by examiner

SHEATH HEATER

CROSS REFERENCE TO RELATED APPLICATION

The present application is based on and claims the benefit of priority to Korean Patent Application No. 10-2017-0113072, filed on Sep. 5, 2017 with the Korean Intellectual Property Office, the entire disclosure of which is incorporated herein for all purposes by this reference.

TECHNICAL FIELD

The present disclosure relates to a sheath heater for heating a cooling water of a vehicle, particularly, an electric vehicle. More particularly, the present disclosure relates to a sheath heater having excellent stability by having an overheat preventing means with excellent heating efficiency which includes a PTC element.

BACKGROUND

In order to implement eco-friendly technologies and to solve problems such as energy exhaustion and the like, electric vehicles are recently emerging. An electric vehicle is operated using a motor that is supplied with electricity from a battery and outputs power, and accordingly, since the electric vehicle has advantages in that it does not discharge carbon dioxide, generates very little noise, and has higher energy efficiency of the motor than that of an engine, the electric vehicle is highlighted as the eco-friendly vehicle.

However, unlike that conventional vehicles using an internal combustion engine to heat a cooling water by a heat source generated from the engine, the electric vehicle that does not have a separately installed engine therein does not heat the cooling water by the heat generated from the engine.

Therefore, an apparatus for heating the cooling water should be separately provided, but according to the related art, a temperature of a sheath heater was controlled and overheating thereof was prevented by applying a temperature sensor to a circuit unit. However, in a case in which a controller or a sensor of the circuit unit fails, since the circuit unit does not control a flow of current of the sheath heater, the sheath heater was overheated and damaged.

The matters described as the related art have been provided only for assisting in the understanding for the background of the present disclosure and should not be considered as corresponding to the related art known to those skilled in the art.

SUMMARY

An object of the present disclosure is to provide a sheath heater capable of effectively preventing overheating of the sheath heater even if a temperature sensor is not directly applied to a circuit unit.

According to an exemplary embodiment of the present disclosure, a sheath heater includes a housing having an accommodating space formed therein; a plurality of main terminals electrically connected to an outside of the sheath heater through an electric circuit, wherein the accommodating space is filled with magnesia and the plurality of main terminals are disposed in the accommodating space to penetrate through one side and another side of the housing; an overheat preventing means located in the housing, connected in series with the electric circuit, and having a PTC element controlling a flow of current of the electric circuit according to a temperature of the PTC element; and a heating element electrically connected to the electric circuit and generating heat during the flow of current.

The PTC element of the overheat preventing means may include one or more negative or positive auxiliary terminals, and the one or more negative or positive auxiliary terminals may be connected to the plurality of main terminals through the heating element and be connected to the electric circuit.

Elastic members having one side connected to one terminal of the one or more negative or positive auxiliary terminals and another side connected to another terminal of the one or more negative or positive auxiliary terminals may be provided outside the one or more negative or positive auxiliary terminals.

The elastic members may pressurize the one or more negative or positive auxiliary terminals to the PTC element such that the PTC element and the one or more negative or positive auxiliary terminals may be in surface-contact with each other.

Insulating members may be each provided between the elastic members and the one or more negative or positive auxiliary terminals to provide electrical insulation between the elastic members and the one or more negative or positive auxiliary terminals which are electrical conductors.

The PTC element may have an insertion hole penetrating through a center of the PTC element, the one or more negative or positive auxiliary terminals may be fastening members of a nut shape having a through-hole formed therein, and a fixing member of a bar shape that a screw thread is formed on an outer circumference surface of the fixing member may be inserted into the insertion hole and be fastened to the through-hole.

An installation groove which is inwardly indented may be formed in a surface of each of the fastening members facing the PTC element, and the installation groove may be provided with an elastic member.

The elastic member may elastically pressurize each of the fastening members to the PTC element to be closely in contact with each other, such that the fastening members and the PTC element may be in surface-contact with each other.

The overheat preventing means may be located at a center of the housing to uniformly transfer heat within the housing during radiation of the PTC element.

One side of the PTC element may be coupled to one terminal of the plurality of main terminals and another side thereof may be connected to an auxiliary terminal having an electrical polarity opposite to that of the one side of the PTC element, and the auxiliary terminal may be coupled to a remaining terminal of the plurality of main terminals through the heating element and be connected to the electric circuit.

Clamping members having one side connected to the one terminal of the plurality of main terminals and another side connected to the auxiliary to urinal may be provided outside the one terminal of the plurality of main terminals and the auxiliary terminal.

The clamping members may pressurize the one terminal of the plurality of main terminals and the auxiliary terminal to the PTC element such that the main terminals and the auxiliary terminals may be in surface-contact with the PTC element.

Insulating members may be each provided between the clamping members and the one terminal of the plurality of main terminals, and between the clamping members and the auxiliary terminal to provide electrical insulation between the clamping members, which are electrical conductors, and the one terminal of the plurality of main terminals or the auxiliary terminal.

The plurality of main terminals or the one or more negative or positive auxiliary terminals which are in surface-contact with the PTC element may include a head part of which one side is in contact with a side surface of the PTC element, and a neck part having one end portion extended from the head part and having another end portion fixed to the heating element.

According to another exemplary embodiment of the present disclosure, there is provided a heating, ventilation and cooling system for a vehicle including a sheath heater, including a housing having an accommodating space formed therein; a plurality of main terminals electrically connected in series with an outside of the sheath heater through an electric circuit, wherein the accommodating space is filled with magnesia and the plurality of main terminals are disposed in the accommodating space to penetrate through one side and another side of the housing; an overheat preventing means located in the housing, connected in series with the electric circuit, and having a PTC element controlling a flow of current of the electric circuit according to a temperature of the PTC element; and a heating element provided to radiate heat generated from the PTC element during the flow of current, wherein the overheat preventing means includes the PTC element, the plurality of main terminals or a separate auxiliary terminal for a connection with an external electric circuit, an elastic member or a clamping member for securing a coupling between the PTC element and the plurality of terminals or the separate auxiliary terminal, and an insulating member insulating between the elastic member or the clamping member and the plurality of main terminals or the separate auxiliary terminal.

DETAILED DESCRIPTION

Hereinafter, a sheath heater according to exemplary embodiments of the present disclosure will be described with reference to the accompanying drawings.

Figure 1:
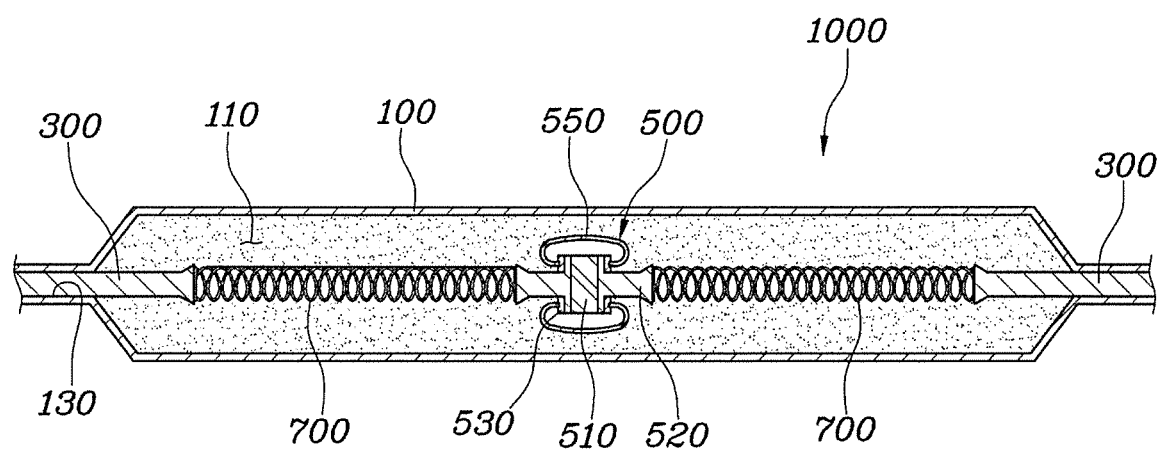
FIG. 1 is an illustrative view of a sheath heater according to an exemplary embodiment of the present disclosure.
Figure 2:
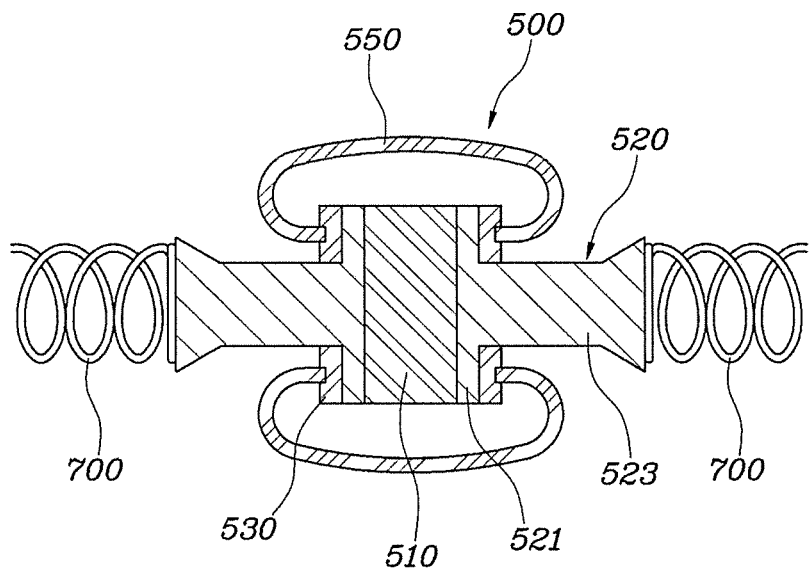
FIG. 2 is an illustrative view of an overheat preventing means of FIG. 1 in detail.
Figure 3:
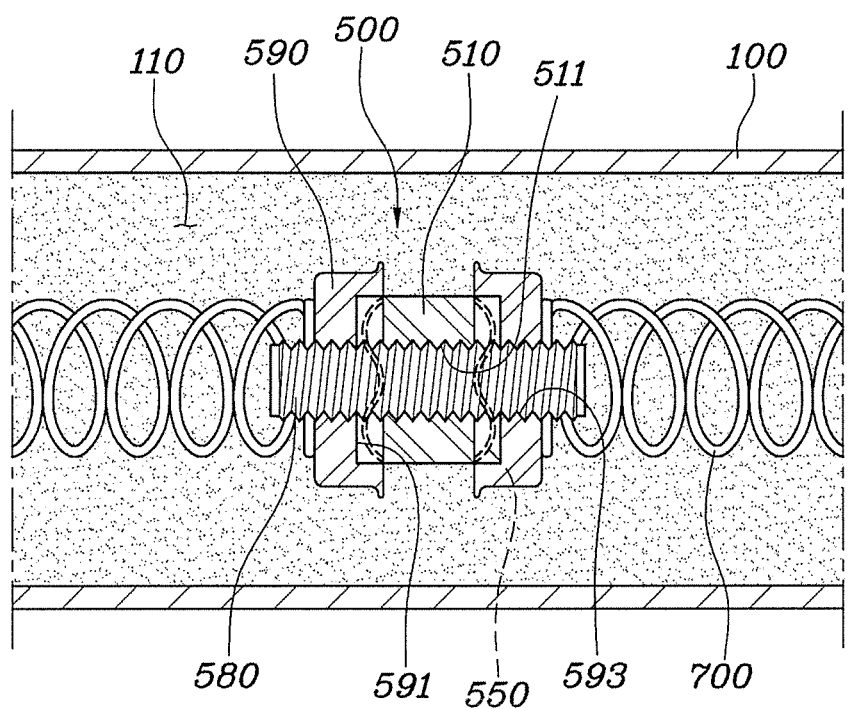
FIG. 3 is an illustrative view of an overheat preventing means according to a second exemplary embodiment of the present disclosure in detail.
Figure 4:
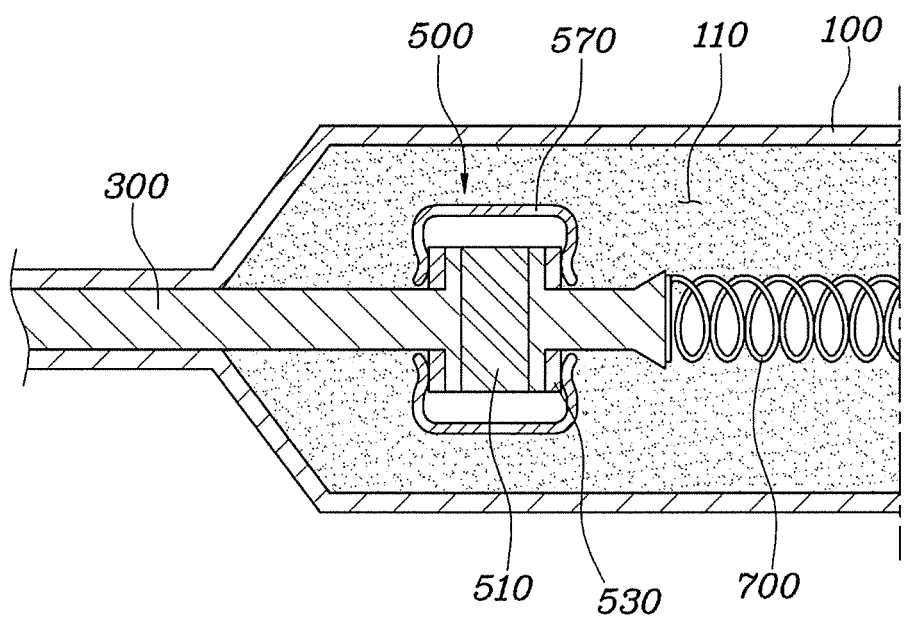
FIG. 4 is a an illustrative view of an overheat preventing means according to a third exemplary embodiment of the present disclosure in detail.
Figure 5:
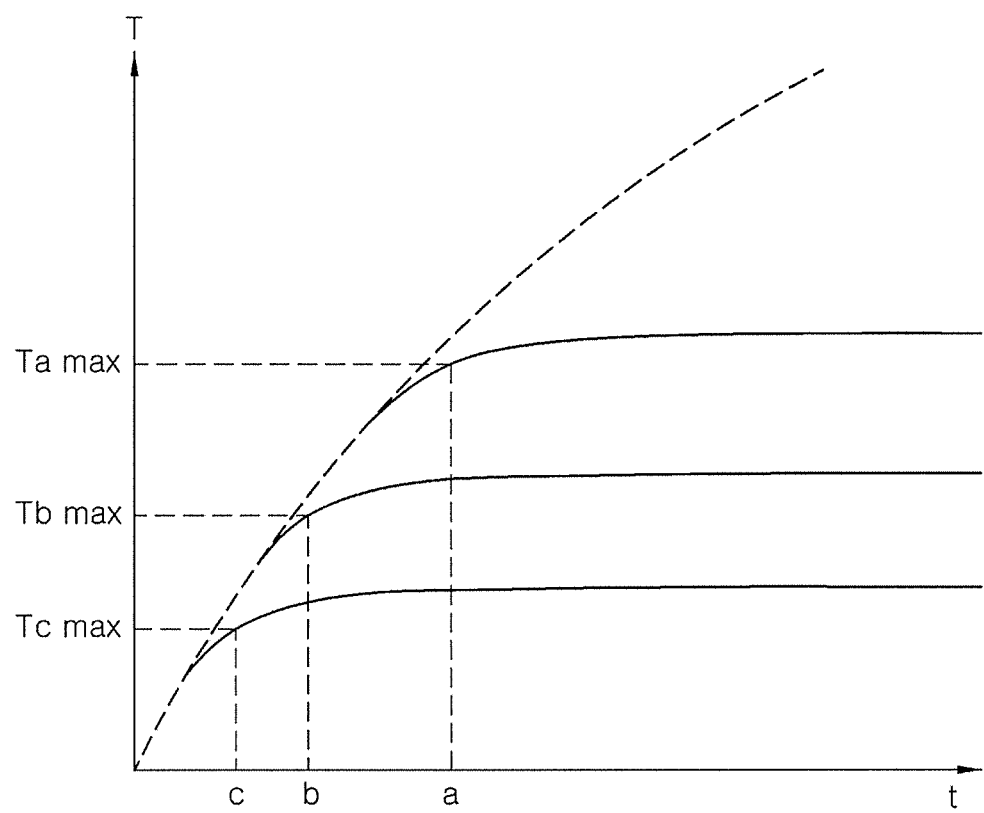
FIG. 5 is a graph showing a relationship between temperature of a PTC element and time.

FIG. 1 is an illustrative view of a sheath heater according to an exemplary embodiment of the present disclosure and FIG. 2 is an illustrative view of an overheat preventing means 500 of FIG. 1 in detail. FIG. 3 an illustrative view of an overheat preventing means 500 according to a second exemplary embodiment of the present disclosure in detail, FIG. 4 is an illustrative view of an overheat preventing means 500 according to a third exemplary embodiment of the present disclosure in detail, and FIG. 5 is a graph showing a relationship between temperature of a PTC element 510 and time.

A sheath heater according to an exemplary embodiment of the present disclosure includes a housing 100 having an accommodating space 110 footled therein; a plurality of main terminals 300 electrically connected to the outside through an electric circuit (not shown), wherein the accommodating space 110 is filled with magnesia (MgO) and the plurality of main terminals 300 are disposed in the accommodating space 110 to penetrate through one side and the other side of the housing 100; an overheat preventing means 500 located in the housing 100, connected in series with the electric circuit, and having a PTC element 510 controlling a flow of current of the electric circuit according to a temperature; and a heating element 700 electrically connected to the electric circuit and generating heat during the flow of current.

The housing 100 has the accommodating space 110 formed therein and coupling holes 130 through which the plurality of main terminals 300 are inserted in opposite sides thereof. The housing 100 has a pipe shape, opposite side end portions thereof gradually contract toward the center of the housing, and the contracted point forms the coupling holes 130, such that the main terminal 300 may be coupled to the housing 100. Alternatively, the housing 100 may also be formed by dividing it into two or more pieces and then boding the divided pieces to each other by a method such as blazing or the like. The accommodating space 110 of the housing 100 is filled with magnesia (MgO). The overheat preventing means 500 and the heating element 700 are located in the accommodating space 110 of the housing 100.

The plurality of main terminals 300 are a negative terminal and a positive terminal which are connected to the electric circuit, and penetrate through one side and the other side of the housing 100, respectively and are installed in the coupling holes 130. Therefore, the negative and positive main terminals 300 of the sheath heater 1000 are electrically connected to the outside through the electric circuit. The main terminal 300 is connected in series with the electric circuit.

The overheat preventing means 500 is located in the accommodating space 110 of the housing 100 and is connected in series with the electric circuit. The overheat preventing means 500 includes a PTC element 510 controlling the flow of current of the electric circuit according to a temperature. Further, the overheat preventing means 500 includes the PTC element 510, an auxiliary terminal 520 for a connection with an external electric circuit, an elastic member 550 or a clamping member 570 for securing a coupling between the PTC element 510 and the main terminal 300 or the auxiliary terminal 520, and an insulating member 530 insulating between the elastic member 550 or the clamping member 570 and the main terminal 300 or the auxiliary terminal 520. A detailed description of the respective configurations will be provided below.

The PTC element 510 of the overheat preventing means 500 radiates heat heated and generated during the flown of current to maintain a constant temperature The PTC element 510 includes a separate temperature sensing unit (not shown) to always sense the temperature of the PTC element 510. The temperature sensed by the temperature sensing unit varies depending on whether or not the PTC element 510 normally generates the heat. Therefore, if a heating amount of the PTC element 510 is decreased due to overheating of the sheath heater 1000 and the temperature of the PTC element 510 is gradually increased, resistance of the PTC element 510 is gradually increased and the flowing of current is controlled at a set cut temperature to interrupt the current in the sheath heater 1000, thereby making it possible to prevent the overheating of the sheath heater 1000.

Further, as illustrated in FIG. 5, since the PTC element 510 may control PTC cut temperature characteristics depending on the kind of PTC, it is possible to implement the sheath heater having a function of limiting various maximum temperatures Tmax (e.g., Ta_max, Tb_max, and Tc_max). Therefore, since the sheath heater may be designed to have different cut temperatures for different types of vehicles, it is possible to provide sheath heater 1000 which may be mounted on each type of vehicle and maintain a constant temperature suitable for each type of vehicle by simply changing the PTC element 510 without separately changing the design, and it is possible to prevent overheating of the sheath heater 1000 even if the temperature sensor is not included in the electric circuit.

FIG. 1 and FIG. 2 illustrate a first exemplary embodiment of the present disclosure. As illustrated in FIG. 1, the overheat preventing means 500 is located at the center of the housing 100. Therefore, the heat radiated to the housing 100 during the radiation of the PTC element 510 may be uniformly transferred. A negative auxiliary terminal 520 and a positive auxiliary terminal 520 are each provided to opposite sides of the PTC element 510. Each of the negative and positive auxiliary terminals 520 includes a head part 521 of which one side is in contact with a side surface of the PTC element 510, and a neck part 523 having one portion extended from the head part 521 and having the other end portion fixed to the heating element 700. The auxiliary terminal 520 is connected to the main terminal 300 through the heating element 700 and is connected to the electric circuit.

The elastic member 550 having one side connected to the negative auxiliary terminal 520 and the other side connected to the positive auxiliary terminal 520 is provided outside the auxiliary terminals 520. The elastic member 550 may be a plate spring and is installed in a state in which it is pressurized in a contracted direction. Therefore, as the auxiliary terminals 520 are pressurized to the PTC element 510 by the elastic members 550, the PTC element 510 and the auxiliary terminals 520 are in surface-contact with each other, thereby making it possible to implement accurate performance and secure stability of an operation.

Further, the insulating member 530 formed of an insulating material such as ceramic or the like is each provided between the elastic member 550 and the auxiliary terminal 520. The insulating member 530 is installed at a point at which the elastic member 550 and the auxiliary terminal 520 are in contact with each other. Therefore, electrical insulation between the elastic member 550 and the auxiliary terminal 520 which are electrical conductors is implemented.

Therefore, according to the first exemplary embodiment, the overheat preventing means 500 is located at the center of the accommodating space 110 of the housing 100. The overheat preventing means 500 includes the PTC element 510 located at the center, the auxiliary terminals 520 each located at the opposite sides of the PTC element 510, and the heating elements 700 each connected to the auxiliary terminals 520 and connecting the auxiliary terminals 520 and the main terminals 300 with each other. The PTC element 510 includes the elastic members 550 and the insulating member 530.

Therefore, during the flow of current, the PTC element 510 of the overheat preventing means 500 and the plurality of heating elements 700 act as resistance, and the sheath heater 1000 may heat the cooling water by the heating elements 700 and magnesia (MgO). Further, the PTC element 510 of the overheat preventing means 500 continuously radiates heat during the flow of current, and in a case in which a heating amount from the PTC element 510 into the housing 100 is decreased due to overheating of the heating elements 700, the temperature of the PTC element 510 is gradually increased and the resistance is increased. As a result, when the temperature is increased to a set temperature of the PTC element 510 or more, the resistance of the PTC element 510 becomes infinite to interrupt the current, thereby disconnecting the connection with the electric circuit and preventing overheating of the sheath heater 1000.

FIG. 3 illustrates a second exemplary embodiment of the present disclosure. As illustrated in FIG. 3, the overheat preventing means 500 is located at the center of the housing 100. Therefore, the heat radiated to the housing 100 during the radiation of the PTC element 510 may be uniformly transferred. The PTC element 510 has an insertion hole 511 penetrating through the center thereof. A negative auxiliary terminal 520 and a positive auxiliary terminal 520 are each provided to opposite sides of the PTC element 510. The auxiliary terminals 520 are fastening members 590 of a nut shape having a through-hole 593 formed in the center thereof. A screw thread is formed on an inner circumference surface of the through-hole 593. Further, a fixing member 580 of a bar shape that the screw thread is formed on an outer circumference surface is inserted into the insertion hole 511 and the through-hole 593 and is fastened thereto. The fixing member 580 may be formed of an insulator such as ceramic or the like. Alternatively, the fixing member 580 may also be formed of a bolt having insulation performance and a nut which is an electrical conductor.

Further, an installation groove 591 which is inwardly indented is formed in a surface of the fastening member 590 facing the PTC element 510 and the installation groove 591 is provided with the elastic member 550. The elastic member 550 may be a wave washer, a plate spring, or the like. Since the fastening member 590 is elastically pressurized to the PTC element 510 to be closely contact with the PTC element 510 and is in surface-contact with the PTC element 510 by the elastic element 550, accurate performance may be implemented and stability of an operation may be secured. The heating elements 700 are each connected to the fastening members 590 and the fastening members 590 and the main terminals 300 are connected with each other through the heating elements 700, such that the overheat preventing means 300 is electrically connected to the electric circuit.

Therefore, according to the second exemplary embodiment, the overheat preventing means 500 is located at the center of the accommodating space 110 of the housing 100. The overheat preventing means 500 includes the PTC element 510 located at the center, the fastening members 590 each located at the opposite sides of the PTC element 510, and the fixing member 580 installed to penetrate through the PTC element 510 and the fastening members 590. The fixing member 580 serves as an insulator. The fastening members 590 are connected to the heating elements 700, and the heating elements 700 are connected to the main terminals 300 and are electrically connected to the electric circuit. Therefore, during the flow of current, the current flows into the PTC element 510 and the fastening members 590 of the overheat preventing means 500, the heating elements 700, and the main terminals 300.

Here, the PTC element 510 of the overheat preventing means 500 and the plurality of heating elements 700 act as resistance, and the sheath heater 1000 may heat the cooling water by the heating elements 700 and magnesia (MgO).

Further, the PTC element 510 of the overheat preventing means 500 continuously radiates heat during the flow of current, and in a case in which a heating amount from the PTC element 510 into the housing 100 is decreased due to overheating of the heating elements 700, the temperature of the PTC element 510 is gradually increased and the resistance is increased. As a result, when the temperature is increased to a set temperature of the PTC element 510 or more, the resistance of the PTC element 510 becomes infinite to interrupt the current, thereby disconnecting the connection with the electric circuit and preventing overheating of the sheath heater 1000.

FIG. 4 illustrates a third exemplary embodiment of the present disclosure. As illustrated in FIG. 4, the overheat preventing means 500 is located to be biased to one side or the other side of the housing 100. Therefore, one side of the PTC element 510 is coupled to one of the main terminals 300 and the other side thereof is connected to the auxiliary terminal 520 having electrical polarity opposite to the one side of the PTC element 510. The auxiliary terminal 520 is coupled to the remaining main terminals (not shown) through the heating element 700 and is connected to the electric circuit. The main terminals 300 or the auxiliary terminals 520 which are in surface-contact with the PTC element 510 include a head part 521 of which one side is in contact with a side surface of the PTC element 510, and a neck part 523 extended from the head part 521 and having the other end portion fixed to the heating element 700. The auxiliary terminal 520 is connected to the main terminal 300 through the heating element 700 and is connected to the electric circuit.

The clamping members 570 having one side connected to the main terminals 300 and the other side connected to the auxiliary terminals 520 are provided outside the main terminals 300 and the auxiliary terminals 520. The clamping members 570 are formed and installed so that pressure is applied in a contract direction. Therefore, since the main terminals 300 and the auxiliary terminals 520 are elastically pressurized to the PTC element 510 by the clamping members 570 and are in surface-contact with each other, accurate performance may be implemented and stability of an operation may be secured.

Further, the insulating member 530 is each provided between the clamping members 570 and the main terminals 300, and between the clamping members 570 and the auxiliary terminals 520. In more detail, the insulating member 530 is installed at points at which the clamping members 570 and the main terminals 300 are in contact with each other and the clamping members 570 and the auxiliary terminals 520 are in contact with each other. Therefore, electrical insulation between the clamping member 570, and the main terminal 300 and the auxiliary terminal 520 which are electrical conductors is implemented.

Therefore, according to the third exemplary embodiment, the overheat preventing means 500 is located at one side or the other side of the accommodating space 110 of the housing 100. The overheat preventing means 500 includes the PTC element 510 located at the center, the main terminals 300 and the auxiliary terminals 520 each located at the opposite sides of the PTC element 510, and the heating elements 700 connecting the auxiliary terminals 520 and other main terminals 300 with each other. Further, the PTC element 510 includes the clamping members 570 and the insulating member 530.

Therefore, during the flow of current, the PTC element 510 of the overheat preventing means 500 and the heating elements 700 act as resistance, and the sheath heater 1000 may heat the cooling water by the heating elements 700 and magnesia (MgO). Further, the PTC element 510 of the overheat preventing means 500 continuously radiates heat during the flow of current, and in a case in which a heating amount from the PTC element 510 into the housing 100 is decreased due to overheating of the heating elements 700, the temperature of the PTC element 510 is gradually increased and the resistance is increased. As a result, when the temperature is increased to a set temperature or more, the resistance of the PTC element 510 becomes infinite to interrupt the current, thereby preventing overheating of the sheath heater 1000.

Further, an electric apparatus including a sheath heater according to an exemplary embodiment of the present disclosure includes a housing 100 having an accommodating space 110 formed therein; a plurality of main terminals 300 electrically connected in series with the outside through an electric circuit, wherein the accommodating space 110 is filled with magnesia (MgO) and the plurality of main terminals are disposed in the accommodating space 110 to penetrate through one side and the other side of the housing 100; an overheat preventing means 500 located in the housing 100, connected in series with the electric circuit, and having a PTC element 510 controlling a flow of current of the electric circuit according to a temperature; and a heating element 700 provided to radiate heat generated from the PTC element 510 during the flow of current, wherein the overheat preventing means 500 includes the PTC element 510, the main terminals 300 or a separate auxiliary terminal 520 for a connection with an external electric circuit, an elastic member 550 or a clamping member 570 for securing a coupling between the PTC element 510 and the terminals, and an insulating member 530 insulating between the elastic member 550 or the clamping member 570 and the main terminals 300 or the auxiliary terminal 520.

According to the sheath heater having the structure as described above, the sheath heater may set the desired temperature according to temperature characteristics of the PTC element and maintain and control the set temperature, and may be prevented from being overheated by the overheat preventing means during the heating of the cooling water, thereby making it possible to prevent the components from being damaged. Further, since the PTC element which is stable for the temperature control is used, it is possible to safely control the cooling water heater of the electric vehicle.

Although the present disclosure is shown and described in connection with the specific exemplary embodiments, it is apparent to those skilled in the art that the modifications and variations may be made without departing from the spirit and scope of the invention as defined by the appended claims.

What is claimed is:

1. A sheath heater comprising:
 a housing having an accommodating space formed therein;
 a plurality of main terminals electrically connected to an outside of the sheath heater through an electric circuit, wherein the accommodating space is filled with magnesia and the plurality of main terminals are disposed in the accommodating space to penetrate through one side and another side of the housing;
 an overheat preventing means located in the housing, connected in series with the electric circuit, and having a PTC element controlling a flow of current of the electric circuit according to a temperature of the PTC element; and a heating element electrically connected to the electric circuit and generating heat during the flow of current, wherein the PTC element of the overheat preventing means includes one or more negative or positive auxiliary terminals, the one or more negative or positive auxiliary terminals are connected to the plurality of main terminals through the heating element and are connected to the electric circuit, and elastic members having one side connected to one terminal of the one or more negative or positive auxiliary terminals and another side connected to another terminal of the one or more negative or positive auxiliary terminals are provided outside the one or more negative or positive auxiliary terminals.

2. The sheath heater of claim 1, wherein the elastic members pressurize the one or more negative or positive auxiliary terminals to the PTC element such that the PTC element and the one or more negative or positive auxiliary terminals are in surface-contact with each other.

3. The sheath heater of claim 1, wherein insulating members are each provided between the elastic members and the one or more negative or positive auxiliary terminals to provide electrical insulation between the elastic members and the one or more negative or positive auxiliary terminals which are electrical conductors.

4. A sheath heater comprising:
a housing having an accommodating space formed therein;
a plurality of main terminals electrically connected to an outside of the sheath heater through an electric circuit, wherein the accommodating space is filled with magnesia and the plurality of main terminals are disposed in the accommodating space to penetrate through one side and another side of the housing;
an overheat preventing means located in the housing, connected in series with the electric circuit, and having a PTC element controlling a flow of current of the electric circuit according to a temperature of the PTC element; and
a heating element electrically connected to the electric circuit and generating heat during the flow of current,
wherein the PTC element of the overheat preventing means includes one or more negative or positive auxiliary terminals,
the one or more negative or positive auxiliary terminals are connected to the plurality of main terminals through the heating element and are connected to the electric circuit,
the PTC element has an insertion hole penetrating through a center of the PTC element,
the one or more negative or positive auxiliary terminals are fastening members of a nut shape having a through-hole formed therein, and
a fixing member of a bar shape that a screw thread is formed on an outer circumference surface of the fixing member is inserted into the insertion hole and is fastened to the through-hole.

5. The sheath heater of claim 4, wherein an installation groove which is inwardly indented is formed in a surface of each of the fastening members facing the PTC element, and the installation groove is provided with an elastic member.

6. The sheath heater of claim 5, wherein the elastic member elastically pressurizes each of the fastening members to the PTC element to be closely in contact with each other, such that the fastening members and the PTC element are in surface-contact with each other.

7. The sheath heater of claim 1, wherein the overheat preventing means is located at a center of the housing to uniformly transfer heat within the housing during radiation of the PTC element.

8. A sheath heater comprising:
a housing having an accommodating space formed therein;
a plurality of main terminals electrically connected to an outside of the sheath heater through an electric circuit, wherein the accommodating space is filled with magnesia and the plurality of main terminals are disposed in the accommodating space to penetrate through one side and another side of the housing;
an overheat preventing means located in the housing, connected in series with the electric circuit, and having a PTC element controlling a flow of current of the electric circuit according to a temperature of the PTC element; and
a heating element electrically connected to the electric circuit and generating heat during the flow of current,
wherein the PTC element of the overheat preventing means includes one or more negative or positive auxiliary terminals,
the one or more negative or positive auxiliary terminals are connected to the plurality of main terminals through the heating element and are connected to the electric circuit,
one side of the PTC element is coupled to one terminal of the plurality of main terminals and another side thereof is connected to an auxiliary terminal having an electrical polarity opposite to that of the one side of the PTC element,
the auxiliary terminal is coupled to a remaining terminal of the plurality of main terminals through the heating element and is connected to the electric circuit, and
clamping members having one side connected to the one terminal of the plurality of main terminals and another side connected to the auxiliary terminal are provided outside the one terminal of the plurality of main terminals and the auxiliary terminal.

9. The sheath heater of claim 8, wherein the clamping members pressurize the one terminal of the plurality of main terminals and the auxiliary terminal to the PTC element such that the one terminal of the plurality of main terminals and the auxiliary terminal are in surface-contact with the PTC element.

10. The sheath heater of claim 8, wherein insulating members are each provided between the clamping members and the one terminal of the plurality of main terminals, and between the clamping members and the auxiliary terminal to provide electrical insulation between the clamping members, which are electrical conductors, and the one terminal of the plurality of main terminals or the auxiliary terminal.

11. The sheath heater of claim 1, wherein the plurality of main terminals or the one or more negative or positive auxiliary terminals which are in surface-contact with the PTC element include a head part of which one side is in contact with a side surface of the PTC element, and a neck part having one end portion extended from the head part and having another end portion fixed to the heating element.

* * * * *